United States Patent
Chandler

(10) Patent No.: US 10,261,766 B2
(45) Date of Patent: Apr. 16, 2019

(54) SLOPPY FEEDBACK LOOP COMPILATION

(71) Applicant: Hewlett Packard Enterprise Development LP, Houston, TX (US)

(72) Inventor: Benjamin Orth Chandler, Palo Alto, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 96 days.

(21) Appl. No.: 15/325,332

(22) PCT Filed: Aug. 28, 2014

(86) PCT No.: PCT/US2014/053232
§ 371 (c)(1),
(2) Date: Jan. 10, 2017

(87) PCT Pub. No.: WO2016/032495
PCT Pub. Date: Mar. 3, 2016

(65) Prior Publication Data
US 2017/0185387 A1 Jun. 29, 2017

(51) Int. Cl.
*G06F 8/41* (2018.01)
*G06F 9/38* (2018.01)
*G06F 9/448* (2018.01)

(52) U.S. Cl.
CPC .............. *G06F 8/4452* (2013.01); *G06F 9/38* (2013.01); *G06F 9/4494* (2018.02)

(58) Field of Classification Search
CPC .......... G06F 8/4452; G06F 8/452; G06F 9/38; G06F 9/4494

USPC .................................................. 717/140–161
See application file for complete search history.

(56) References Cited

U.S. PATENT DOCUMENTS

| | | | | |
|---|---|---|---|---|
| 7,120,906 B1 * | 10/2006 | Stephenson | ............. | G06F 8/443 717/158 |
| 7,562,344 B1 * | 7/2009 | Allen | ........................ | G06F 8/33 717/100 |
| 8,156,481 B1 * | 4/2012 | Koh | .......................... | G06F 8/35 717/151 |
| 8,387,026 B1 * | 2/2013 | Hundt | ..................... | G06F 8/443 717/140 |
| 8,719,774 B2 * | 5/2014 | Wang | ........................ | G06F 8/34 717/109 |

(Continued)

OTHER PUBLICATIONS

Childers, B.R. et al.; "Custom Wide Counterflow Pipelines for High Performance Embedded Applications"; dated: Mar. 2, 2004, 12 Pgs.

(Continued)

*Primary Examiner* — Marina Lee
(74) *Attorney, Agent, or Firm* — Hewlett Packard Enterprise Patent Department

(57) ABSTRACT

A system, method, and a computer-readable storage device for sloppy feedback loop compilation are described herein. For example, a dataflow application definition can be obtained. The dataflow application definition may include a feedback loop bounding a compute block. It may then be determined that the feedback loop is to be compiled as a sloppy feedback loop. The dataflow application can then be compiled as an executable object that pipelines the compute block of the dataflow application.

20 Claims, 9 Drawing Sheets

(56) References Cited

U.S. PATENT DOCUMENTS

| | | | |
|---|---|---|---|
| 9,710,354 B2* | 7/2017 | Klausner | G06F 11/3409 |
| 2004/0019886 A1 | 1/2004 | Berent et al. | |
| 2008/0320444 A1* | 12/2008 | Meijer | G06F 8/33 |
| | | | 717/110 |
| 2009/0276758 A1* | 11/2009 | Song | G06F 8/456 |
| | | | 717/124 |
| 2009/0276766 A1* | 11/2009 | Song | G06F 8/456 |
| | | | 717/159 |
| 2013/0080760 A1* | 3/2013 | Li | G06F 11/3409 |
| | | | 713/100 |
| 2014/0040855 A1 | 2/2014 | Wang et al. | |
| 2014/0298307 A1* | 10/2014 | Johnson | G06F 8/443 |
| | | | 717/158 |
| 2017/0185387 A1* | 6/2017 | Chandler | G06F 8/4452 |

OTHER PUBLICATIONS

International Searching Authority, The International Search Report and the Written Opinion, PCT/US2014/053232, dated May 13, 2015, 9 Pages.

Neelakantam, N. et al.; "Program Orienteering"; dated: May 12, 2004, 33 Pgs.

Renganarayana, L. et al.; "Programming with Relaxed Synchronization"; dated: Oct. 21, 2012, 10 Pgs.

Triantafyllis, S. et al.; "Compiler Optimization-space Exploration"; dated: Feb. 28, 2003, 12 Pgs.

\* cited by examiner

SLOPPY FEEDBACK LOOP COMPILATION

BACKGROUND

With the saturation of central processing unit (CPU) clock frequencies and the approaching end of transistor scaling, future progress in computing power may be realized from increased parallelism in software and the introduction of more efficient parallel hardware architectures. One example of software that exploits parallelism in hardware architectures is MapReduce® frameworks, such as Hadoop®. Other examples include Message Passing Interface (MPI) programs that typically involve libraries to facilitate exchanging message between programs running on hardware clusters.

BRIEF DESCRIPTION OF DRAWINGS

Examples are described in detail in the following description with reference to examples shown in the following figures.

DETAILED DESCRIPTION

Figure 1:
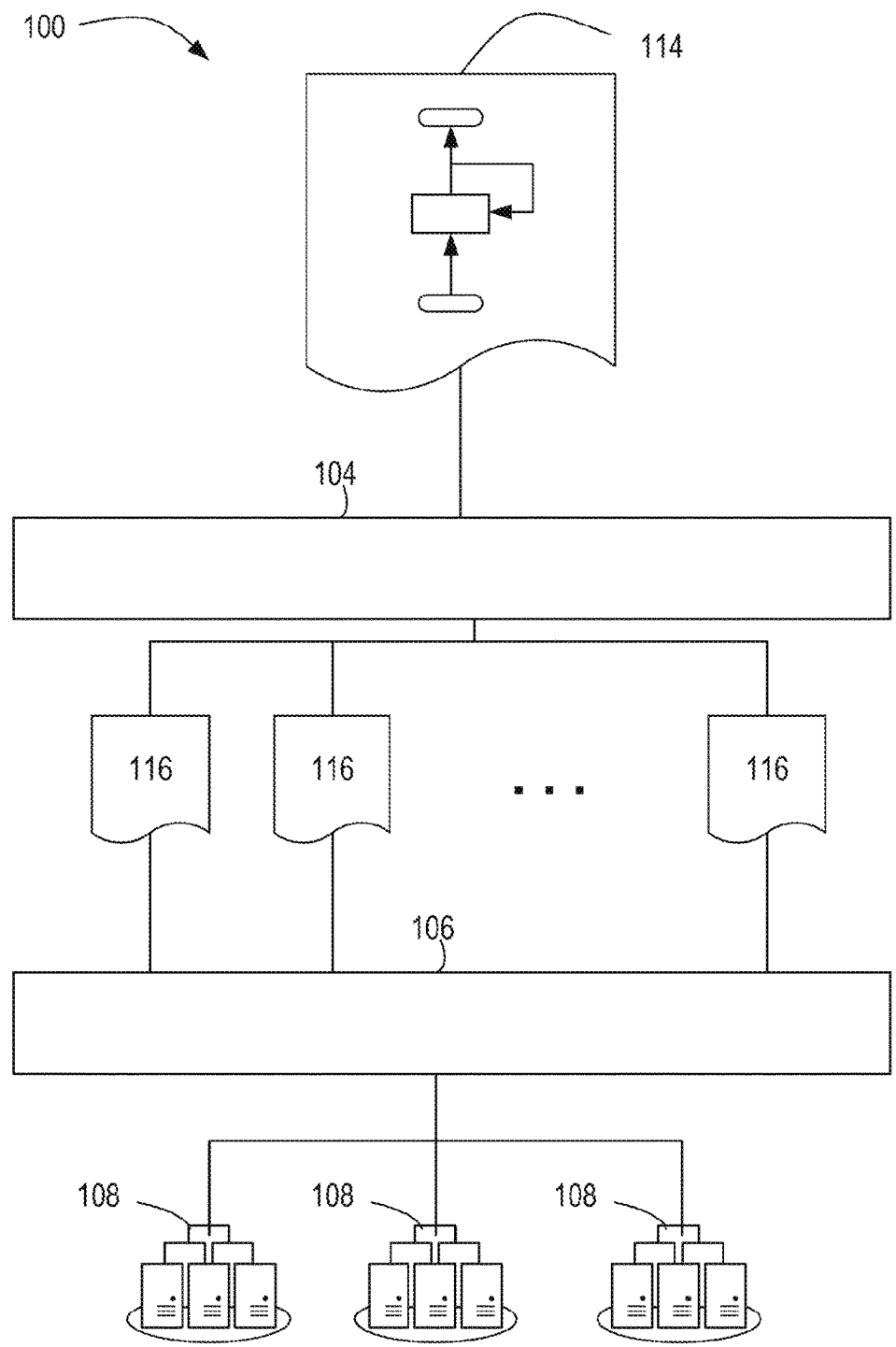
FIG. 1 illustrates an example dataflow processing system configured to execute dataflow applications in a parallel computing environment, according to an example.

Exploiting parallelism of hardware and software may be achieved via pragmatic methods employed by a user, such as a programmer. For example, a user may develop hand crafted programs that properly manages the parallelism of the hardware (e.g., processor clusters) and software features (e.g., messaging and synchronization). However, one drawback in developing hand crafted programs is that the programmer may need to be aware of managing memory communication costs and synchronizing control of multiple threads of execution, each of which may require an understanding of the underlying hardware executing these programs. Not only is this a difficult challenge for programmers but it also limits the portability of the programs. That is, changes in the underlying hardware may cause a ripple effect of changes to the software.

To overcome these problems of relying on a programmer to develop applications that manage communication costs and synchronizing threads of execution, some examples discussed herein may relate to techniques of compiling applications modeled as dataflow applications, which may be capable of being run on parallel hardware systems. Dataflow applications may specify an input to the dataflow (as may be acquired via a sensor, for example), a computing block that processes the input, and an output (which, according to an example, may drive functionality performed by an actuator). The flow of data through a dataflow application may be governed by a dataflow clock cycle. For example, a dataflow clock cycle may be a period of time in which data flows from an input field specified by a dataflow application to an output specified by the dataflow application. It is to be appreciated that a dataflow clock cycle is different from a clock cycle of an underlying hardware in that a dataflow clock cycle is a timing construct that synchronizes a flow of data within programming constructs while a hardware clock cycle is a timing construct that synchronizes circuitry of a processor, for example.

Further, example methods, systems, and computer-readable storage devices discussed herein may describe techniques for compilation of sloppy feedback loops. A sloppy feedback loop may be a programming construct for a feedback loop which relaxes a strict timing constraint in a dataflow application. In some cases, a programmer may program a dataflow application to include a feedback loop to feed data derived from the output of a compute block back to the compute block for subsequent iterations. In this way, a programmer may use feedback loops to develop dataflow applications that store and adjust persistent state data over multiple iterations of executing the dataflow application. This model of a dataflow application feedback loops may be useful in implementing a machine learning application or any other suitable cognitive application or data processing application.

However, a feedback loop can impact the performance of a dataflow application. Such may be the case because, unless a programmer manually optimizes a feedback loop, the feedback loop may introduce a data dependency between the input to the compute block or some field within the compute block with the output of the compute block. Thus, in some cases, this data dependency may cause a compiler to define a dataflow clock cycle for a dataflow application to include: receiving an input, processing the input through the compute block, storing the output in the output filed, and feeding a state update back to the compute block through the feedback loop. After the dataflow clock cycle completes, the dataflow application can receive and process the next set of input. This manner of defining a dataflow clock cycle may be referred to a strict timing constraint and a feedback loop compiled in accordance to a strict timing constraint may be referred to as a strict feedback loop.

The performance of the dataflow application using a strict timing constraint may be dependent on the length of the compute block—feedback loop path. That is, new input data may not be processed until the prior dataflow clock cycle completes. To improve performance of a feedback loop in a dataflow application, a programmer may optimize the feedback loop but may need to fully understand how to balance latency, memory consumption, and compute throughput to hand optimize and synchronize the dataflow application. These hand optimization techniques are often difficult to do for even a specific hardware platform, let alone for arbitrary hardware platforms. In practice, this means dataflow applications that include feedback loops compiled with a strict timing constraint can be extremely challenging to program and are likely to be hand optimized by a programmer for each specific hardware configuration the dataflow application may operate on.

Rather than using a strict timing constraint, some examples discussed herein may compile a feedback loop based on a compiler using a sloppy timing constraint. A sloppy timing constraint may relax a dependency introduced by a feedback loop. To illustrate, a programmer, again, may write a dataflow application that includes an input field, a compute block to process the input field, an output field to store an output of the compute block, and a feedback loop that feeds data derived from the output of the compute block back to the compute block for subsequent iterations. Using a sloppy timing constraint, the compiler may pipeline the compute block into multiple stages, where a dataflow clock cycle is a time period in which a stage begins and completes execution. Pipelining a compute block may be a technique where the compiler breaks up the dataflow application into a sequence of stages, where the output of one stage is the input to a subsequent stage. Further, a dataflow clock cycle may be measured as a period in time in which a stage, rather than a compute block, can execute a function on input data received from the prior stage of the pipeline.

In some examples, compiling a feedback loop of a dataflow application with a sloppy timing constraint may allow a compiler to apply state changes to a compute block as slowly as necessary to achieve comparatively improved throughput. Thus, the benefit of a sloppy timing model is that in some cases higher performance and efficiency can be achieved with less manual optimization. A properly tuned feedback loop in a dataflow application can fully utilize an underlying parallel platform and achieve a higher throughput than a poorly tuned loop. Allowing a user to programmatically specify a sloppy timing loop gives the compiler a free hand to violate correctness where appropriate and achieve a performance gain with no manual optimization.

In an example, a computer device of a compiler system may obtain a dataflow application definition. The dataflow application definition including a feedback loop bounding a compute block. The computer device of the compiler system may then determine that the feedback loop is to be compiled as a sloppy feedback loop. The computer device of the compiler system may then compile the dataflow application definition into an executable object that pipelines the compute block of the dataflow application.

In another example, a computer device may be configured to access a dataflow application definition. The dataflow application definition may include a compute block with a feedback loop connecting the output of the compute block with state data in the compute block. The computer-device may then relax a timing constraint associated with the compute block and the feedback loop based on a determination that the compute block and the feedback loop are to be treated as a sloppy feedback loop. The computer-device may then compile the dataflow application definition into an executable object with the relaxed timing constraint.

In yet another example, a computer-readable storage device comprising instructions that, when executed, cause a processor of a computer device to obtain a user-defined dataflow application. The user-defined dataflow application may include a feedback loop bounding a compute block. The instructions may also cause the processor to determine that the feedback loop is to be compiled as a sloppy feedback loop. The instructions may also cause the processor to compile the dataflow application definition into an executable object that breaks the compute block into stages. A dataflow clock cycle for the dataflow application is a period of time in which data flows from an input to a stage to an output of the stage.

These and other examples are now described in greater detail.

FIG. 1 illustrates an example dataflow processing system 100 configured to execute dataflow applications in a parallel computing environment, according to an example. The dataflow processing system 100, as shown in FIG. 1, includes a compiler system 104, a runtime system 106, and computer resource systems 108. The illustrated layout of the dataflow processing system 100 shown in FIG. 1 is provided merely as an example, and other example dataflow processing systems may take on any other suitable layout or configuration. For example, although FIG. 1 shows that the compiler system 104 is a separate system from the runtime system 106, other examples may be implemented such that the compiler system 104, whole or in part, is part of the system as the runtime system 106.

The compiler system 104 may be a computer-device configured to receive a dataflow application definition 114 as input and compile the dataflow application definition 114 into executable objects 116. In some cases, the dataflow application definition 114 may be a file, written by a user (e.g., a programmer), that includes data or logic that expresses a dataflow application that includes a sloppy feedback loop. In some cases, a programmer may create the dataflow application definition 114 to model a dataflow application that is to be executed on the computer resource systems 108. For example, a programmer can create the dataflow application definition 114 by using a text or graphical editor to input a set of primitives that express, among other things, dynamic fields and dataflow operators. A dynamic field may be a primitive data type (e.g., integers, floating points, characters, Booleans, and the like) or complex data type (e.g., multi-dimensional array, structure, class, or the like) that is used to represent inputs, outputs, computational intermediates, and persistent state for the dataflow application. A dataflow operator combines one or more dynamic fields (referred to as input dynamic fields) to create a new dynamic field by performing a computation on the input dynamic fields.

A dataflow application may operate as a state machine that evolves in discrete time, as may be measured by a dataflow clock cycle. As described above, a dataflow clock cycle may represent a period during which data flows completely from the inputs of a computational unit to the outputs of the computational unit. In a strict feedback loop case, a computational unit may be a compute block bounded by the strict feedback loop. In a sloppy feedback loop case, because the compiler is free to pipeline the compute block, the compiler may break the compute block into multiple stages where each stage in the compute block is a computational unit.

As described above, a programmer can model persistent state (and hence dataflow applications that include aspects of learning, adaptation, and iteration) in a dataflow application through feedback loops. In an example, a feedback loop can be used to feed back the state of a dynamic field at a given time back onto itself or another field at the next dataflow clock cycle in order to provide control loops and learning. A sloppy feedback loop may be used to apply a sloppy timing constraint when the feedback loop is compiled. In this way, the compute block of a sloppy feedback loop may be pipelined and executed over multiple dataflow clock cycles.

Continuing with the description of FIG. 1, the executable objects 116 are products of the compiler system 104 compiling the dataflow application definition 114. The executable objects 116 may include instructions derived from the dataflow application definition 114 that can be executed by the computer resource systems 108. In some cases, the instructions are machine instructions (e.g., binary code). In other cases, the instructions are in intermediary form that can is capable of further translation into machine instructions. The further translation may include further compilation or execution by an interpreter executing on the computer resource systems 108.

The runtime system 106 may be a computer-device configured to partition and download the executable objects 116 onto the computer resource systems 108. Further, during execution of the executable objects 116, the runtime system 106 coordinates with the computer resource systems 108 so that data from the dynamic fields are exchanged between the computing resources located on different network nodes, and orchestrates the execution of the executable objects.

The computer resource systems 108 may be computing devices configured to execute the executable objects 116. In some cases, the computing devices may be clusters of computer devices interconnected with a network, with each computer device consisting of a central processing unit (CPU) and one or more graphical processor units (GPUs). The runtime system 106 may use the GPUs to execute specialized instructions (e.g., mathematical calculations), and the CPUs for communication of information between the nodes and to synchronize the global computation of the dataflow application.

Figure 2:
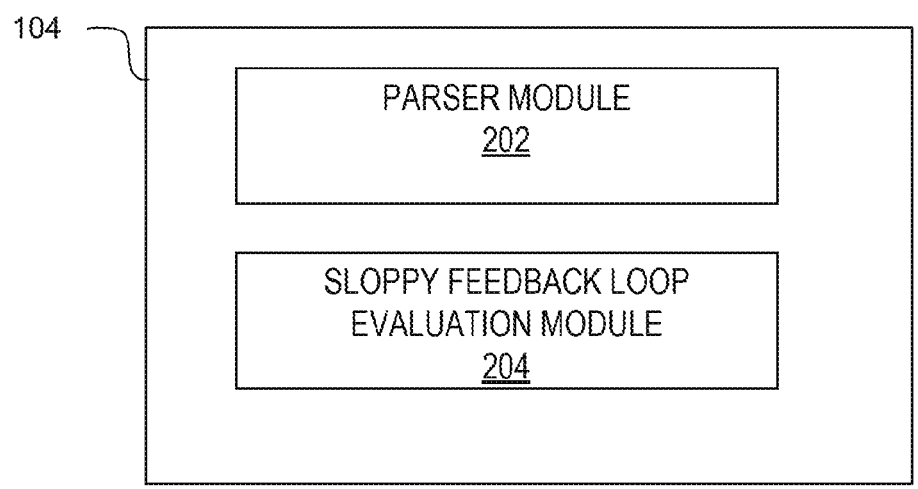
FIG. 2 is a block diagram illustrating the example modules of the compiler system shown in FIG. 1, in accordance to an example.

The compiler system 104 of FIG. 1 is now described in greater detail. FIG. 2 is a block diagram illustrating the example modules of the compiler system 104 shown in FIG. 1, in accordance to an example. The compiler system 104 shown in FIG. 2 includes a parser module 202 and a sloppy feedback loop evaluation module 204.

The parser module 202 may be a computer implemented module that is configured to parse data from a dataflow application definition. In some cases, in parsing a dataflow application definition, the parser module 202 may build a parse tree that represents dependencies between the computational units of a dataflow application. For example, the parser module 202 may build a parse tree that includes data that specifies that a dynamic field may depend on the value of another dynamic field. Further, the parser module 202 may build a parse tree that includes data that specifies that a dynamic field may depend on a feedback loop. Still further, the parser module 202 may identify that a feedback loop is a sloppy feedback loop.

The sloppy feedback loop evaluation module 204 may be a computer-implemented module that is configured to pipeline a dataflow application based on detecting a sloppy feedback loop. Examples of pipelining a dataflow application is discussed in greater detail in the forgoing. As used herein, modules may be implemented by processors executing instructions stored in a computer-readable storage device or by hardware logic (e.g., application specific integrated circuits).

Figure 3:
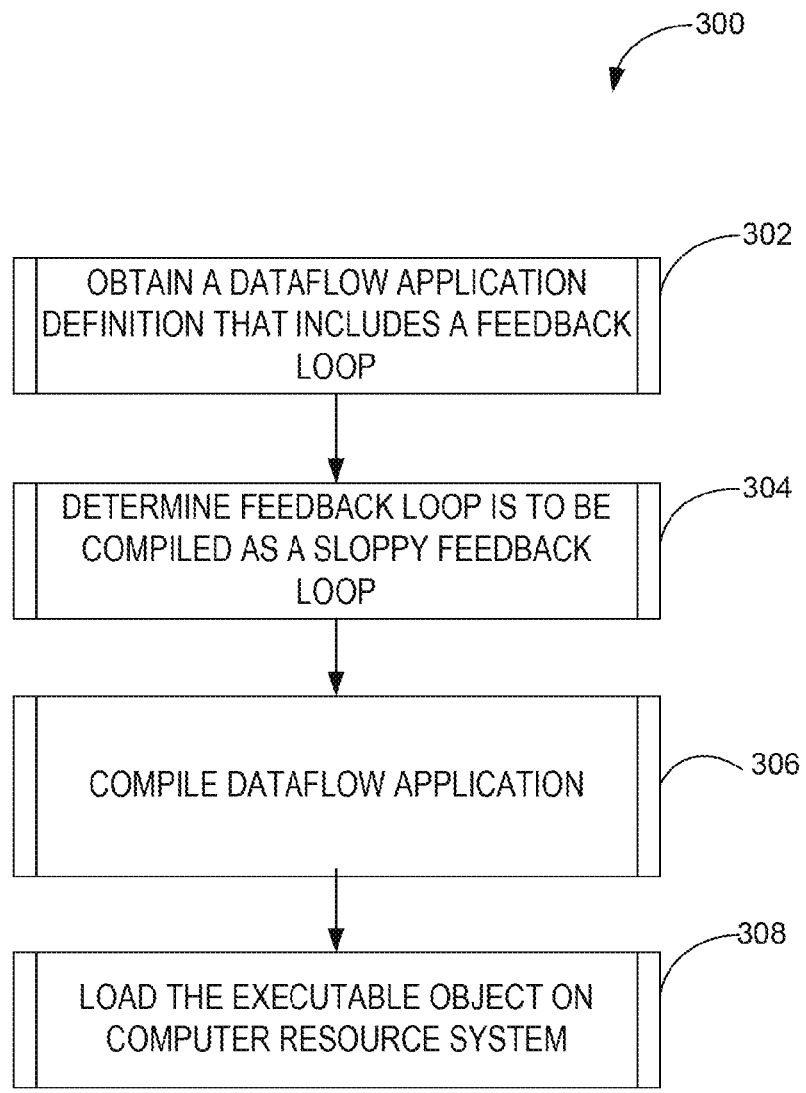
FIG. 3 is a flowchart illustrating an example method of compiling a dataflow application with a sloppy feedback loop, in accordance with an example.

Operations of a compiler system are now described in greater detail. For example, FIG. 3 is a flowchart illustrating an example method 300 of compiling a dataflow application with a sloppy feedback loop, in accordance with an example. The method 300 may be performed by the modules, logic, components, or systems shown in FIGS. 1 and 2 and, accordingly, is described herein merely by way of reference thereto. It is be appreciated that the method 300 may, however, be performed on any suitable hardware.

The method 300 may begin at operation 302 when the parser module 202 obtains a dataflow application definition. In some cases, the parser module 202 may obtain the dataflow application definition responsive to a request from a programmer to compile the dataflow application definition stored in a specified file. As described above, a dataflow application definition include programmer specified data that defines a model of a dataflow that includes interconnected dynamic fields and dataflow operators. In some cases, a dataflow application can be modeled as a state machine that evolves in discrete time, as may be measured as a dataflow clock cycle that defines a period during which data flows completely from the inputs of compute units in the dataflow application to outputs of the compute units. The dataflow application definition may include a feedback loop bounding a compute block.

At operation 304, the parser module 202 may determine that the feedback loop is to be compiled as a sloppy feedback loop. In some cases, the parser module 202 may differentiate a sloppy feedback loop from a strict feedback loop based on a determinable syntax found in the dataflow application definition. For example, a given sloppy feedback syntax may be used to connect the output of a dataflow operator with a dynamic field to signal that the feedback loop created by that connection is a sloppy feedback loop. In some cases, syntax for a feedback loop may include a parameter to enable or disable sloppy feedback loop.

Based on detecting the sloppy feedback loop, at operation 306, the sloppy feedback loop evaluation module 204 may compile the dataflow application definition into an executable object that pipelines compute block of the dataflow application. In some cases, the sloppy feedback loop evaluation module 204 may generate executable objects that pipeline the compute block by building a dependency graph of the dynamic fields and dataflow operators in the compute block and dividing the dependency graph into stages so that a group of dynamic fields belonging to one stage are the inputs to the dynamic fields of a later stage.

At operation 308, the runtime system 106 may load the executable objects on the computer resource systems 108. As discussed above, the runtime system 106 may coordinate execution of the executable objects 116. This may include ensuring that the feedback loop of the executable objects is pipelined. In some cases, the runtime system 106 may ensure that the executable objects 116 are executed by the computer resource systems 108 in parallel.

Figure 4:
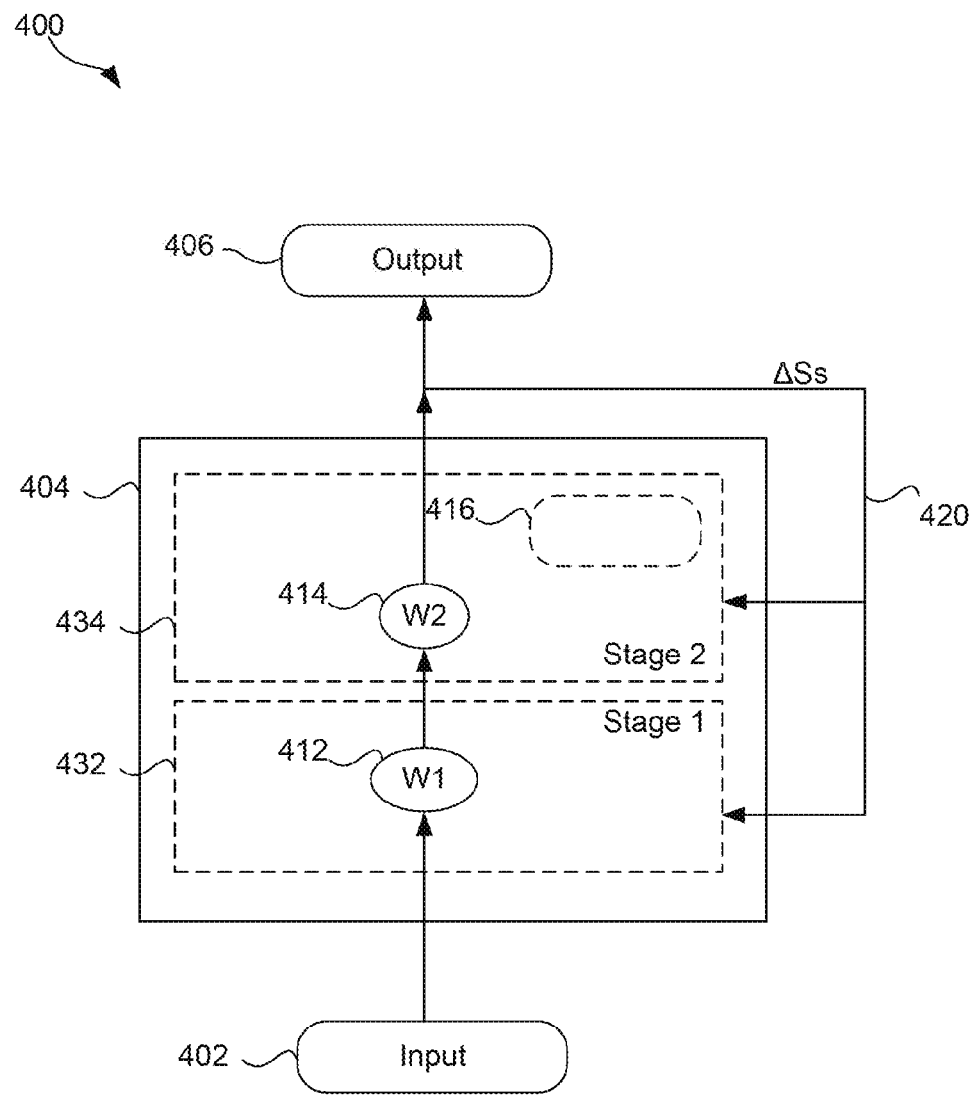
FIG. 4 is a diagram illustrating an example of pipelining a dataflow application that includes a sloppy feedback loop, according to an example.

FIG. 4 is a diagram illustrating an example of pipelining a dataflow application 400 that includes a sloppy feedback loop, according to an example. As discussed above, pipelining a dataflow application may be part of operation 306 of FIG. 3. In an example, the dataflow application 400 may be stored in the dataflow application definition 114 of FIG. 1. The dataflow application 400 may represent a model of a dataflow application that may execute on computer resource systems. For example, the dataflow application 400 may represent a dataflow application compiled as an executable object. Elements of FIG. 4 that are illustrated with solid lines may represent elements that are programmer specified, as may be stored in a dataflow application definition. Elements of FIG. 4 that are illustrated with dashed lines may represent elements that introduced by a compiler system, as may be the result of compilation of a dataflow application definition.

The dataflow application 400 shown in FIG. 4 may include an input dynamic field 402, a compute block 404, and an output dynamic field 406. It is appreciated that the number and arrangement of the input dynamic field 402, the compute block 404, and the output dynamic field 406 is provided by way of example, and not limitation, to facilitate discussion of a dataflow application. Accordingly, other examples can include more or less input dynamic fields, compute blocks, and output dynamic fields, or arranged differently than what is shown in FIG. 4.

The input dynamic field 402 may be a dynamic field used to store data received by the dataflow application 400. In an example, the input dynamic field 402 may store data received via a sensor communicatively coupled to a computing device. By way of example and not limitation, video data, audio data, spatial data, location data, temperature data, pressure data, and any other suitable measurable data are examples of data that may be received by a sensor.

The compute block 404 may be data or logic that defines a dataflow for processing the values stored in the input dynamic field 402. The compute block 404 may include a path of dynamic fields and dataflow operators. For example, as shown FIG. 4, the compute block 404 includes state functions 412, 414. Each of the state functions 412, 414 may apply a weighting function that adjusts the values passed through by the input dynamic field 402 based on a current weight. Even though the state functions 412, 414 are represented by FIG. 4 as weighting functions, the state functions 412, 414 can be any suitable function that operates according to state data that varies over time. In some cases, the state data (e.g., a weight factor) for each of the state functions 412, 414 may be stored in a corresponding dynamic field.

The output dynamic field 406 may be a dynamic field used to store data processed by the compute block 404. In an example, the output dynamic field 406 may represent data that is sent to or retrieved by an actuator communicatively coupled to a computing device. By way of example and not limitation, video data, audio data, spatial data, location data, temperature data, pressure data, and any other suitable measurable data are examples of data that may be sent to or retrieved by an actuator.

As shown, the output of the compute block 404 is fed to the output dynamic field 406 and also fed back to compute block 404 via feedback loop 420. The feedback loop 420 may carry data (ΔSs) that is usable to adjust the state of the state functions 412, 414 for the next execution of the compute block.

In operation, using a strict feedback loop, the input dynamic field 402 may receive input data from a sensor, for example. The input data may then be fed to the compute block 404, and the compute block may store output data in the output dynamic field 406. The compute block may also feed state change data back to the compute block to update the state functions 412, 414. In this way, a dataflow clock cycle doesn't complete until the feedback loop feeds the state change back to the compute block 404 because the compute clock 404 and the feedback loop 420 are treated as a single computational unit. Further, the input dynamic field 402 doesn't receive the next input data until the subsequent dataflow clock cycle begins. Thus, the dataflow clock cycle and, in turn, throughput of a dataflow application that includes a strict feedback loop may be dependent on the length of the path of the feedback loop.

In comparison, compiling a dataflow application by treating the feedback loop as a sloppy feedback loop may, in some cases, improve throughput by allowing a compiler to pipeline the execution of the compute block 404. For example, as previously discussed with reference to operation 306 of FIG. 3, a compiler system may introduce stages 432, 434. A stage may be a compiler introduced split of the compute block 404 that groups state functions that are independent from each other (e.g., that may be processed in parallel with each other). For example, stage 432 may include a group of state functions that are independent from each other. Likewise, stage 434 may include a group of state functions that are also independent from each other. However, the state functions across stages may depend on each other. For example, the input of state function 414 may depend on the output of state function 412.

Further, the stages 432, 434 may be treated as separate computational units such that the compute block 404 can be broken into multiple dataflow clock cycles. Thus, pipelining the compute block 404 may result in an executable object with executable instructions that operates according to a dataflow clock cycle measured as a time period in which data flows in and out of a single stage of the compute block 404 rather than through the whole compute block 404. Consequently, in a sloppy feedback loop, it may take several dataflow clock cycles for an input data to flow through the compute block 404 to the output of the dataflow application, whereas a strict feedback loop may only take a single dataflow clock cycle.

Additionally, the compiler system may in some cases add timing dynamic fields to assist in processing input data across multiple pipeline stages. The number of timing dynamic fields added by a compiler may depend on the number of stages added by the compiler (e.g., if N stages, the compiler may add N−1 timing dynamic fields). For example, the compiler system may introduce the timing dynamic field 416 to the stage 434 so that input data received at the input dynamic field 402 is processed through the compute block 404 using state data that is consistent across stages 432, 434. The timing dynamic field 416 is described in greater detail below with reference to FIGS. 5A-D. In some cases, because the compiler breaks the compute block 404 into multiple stages, a runtime system is free to execute each stage on a separate processor (e.g., CPU, GPU, or the like) of a computer resource system.

FIGS. 5A-D are diagrams illustrating a pipeline execution of the dataflow application 400 shown in FIG. 4 over time, in accordance to an example. It is to be appreciated, the execution shown in FIGS. 5A-D is one example of a pipeline execution and other variations of the executions are possible. For example, in some cases, more or less stages may be used to pipeline the execution of the dataflow application 400.

Figure 5A:
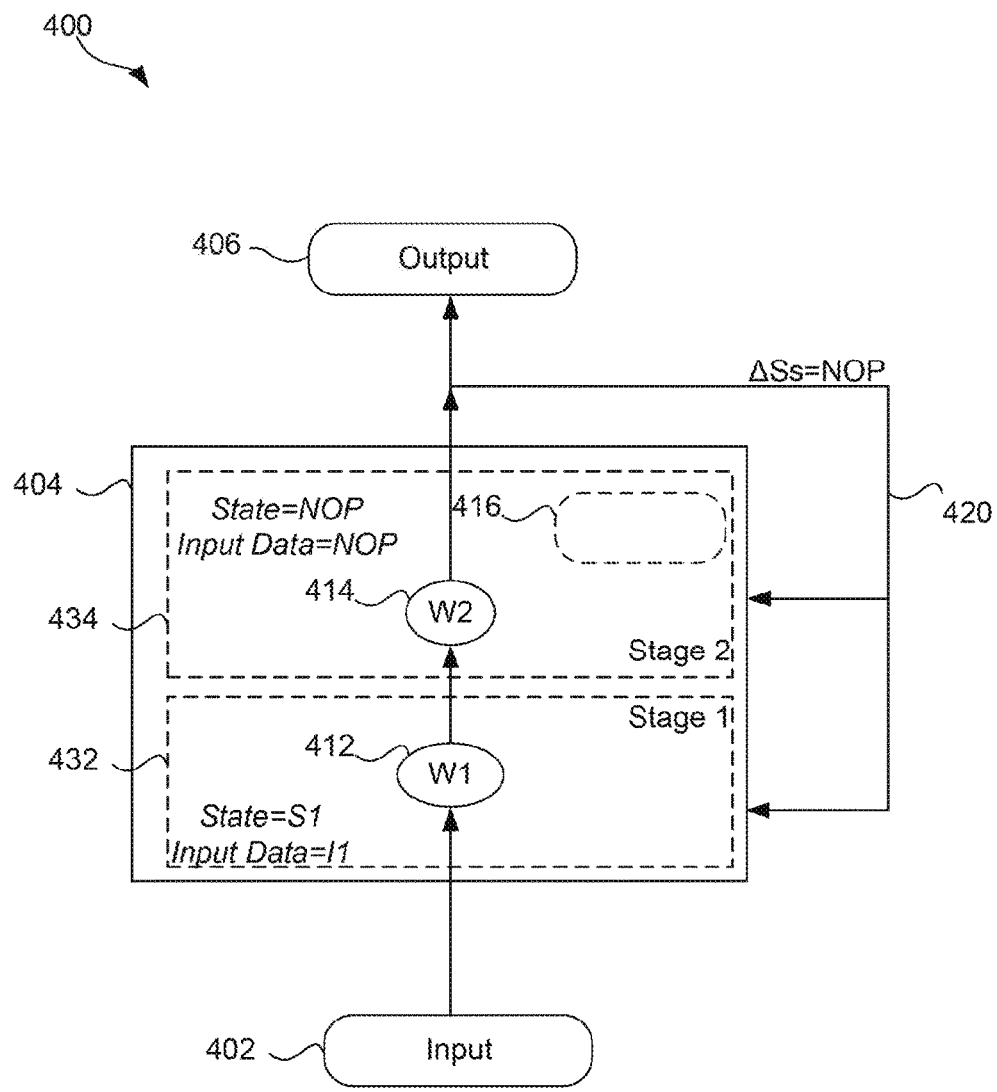
FIGS. 5A-D are diagrams illustrating a pipeline execution of the dataflow application shown in FIG. 4 over time, in accordance to an example.

As FIG. 5A illustrates, during dataflow clock cycle T, stage 432 may execute the state function 412 on a first input (e.g., I1) using an initial state (e.g., S1). If the pipeline starts empty, as is the case for FIG. 5A, stage 434 may perform a no operation (NOP), as this stage in the pipeline has no data to execute on. Further, the feedback loop 420 may abstain from updating any state data in the compute block 404.

Figure 5B:
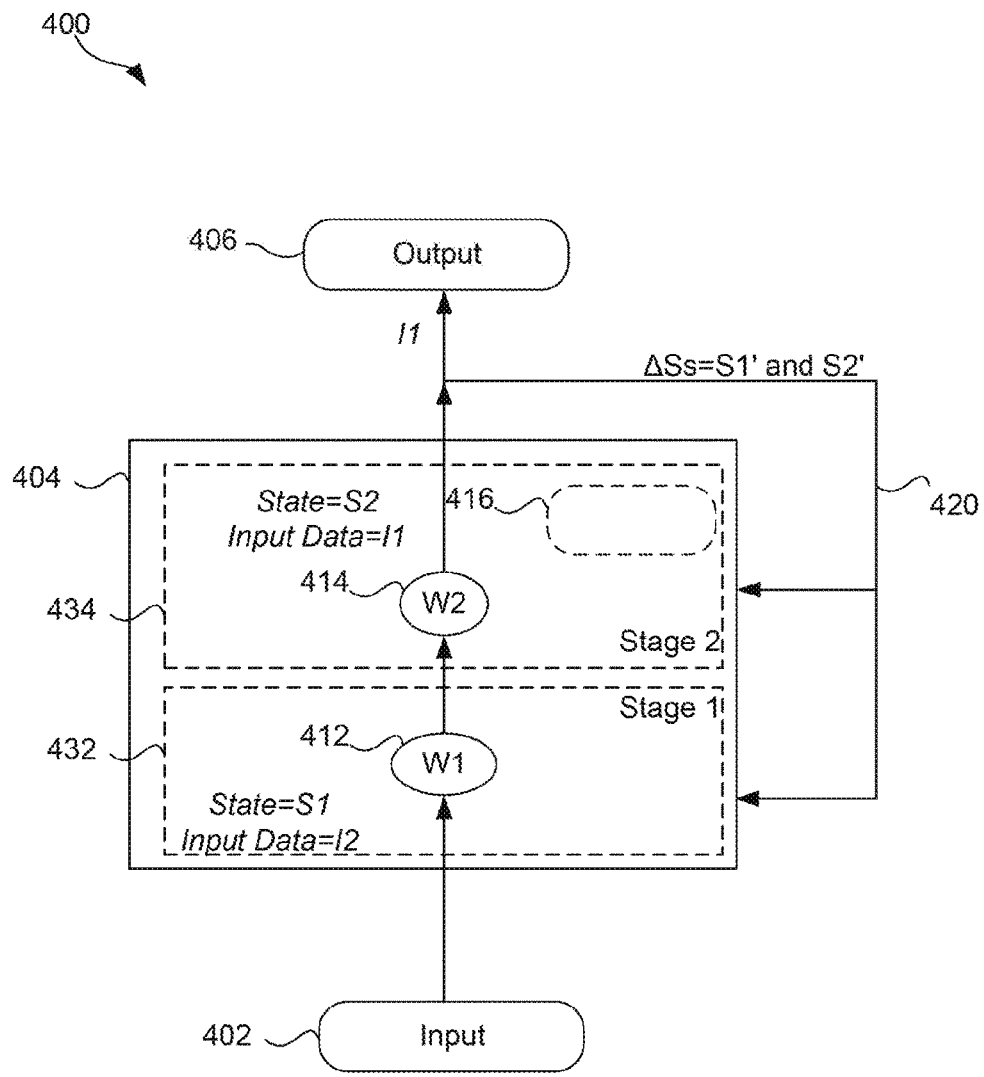

As FIG. 5B illustrates, during dataflow clock cycle T+1, stage 432 may execute the state function 412 on the next input data (e.g., I2), using the initial state data (e.g., S1). Note that this execution may differ from the execution of a strict feedback loop in that, because of the timing constraints in a strict feedback loop, the second input data (I2) would execute on updated state data rather than initial state data. FIG. 5B shows that during dataflow clock cycle T+1, the state function 414 may execute on the first input (e.g., I1) using the initial state for the state function 414 (e.g., S2). Thus, upon the completion of dataflow clock cycle T+1, the first input (I1) is outputted to the output dynamic field 406 in two dataflow clock cycles. In some cases, the state changes for the state functions 412, 414 (e.g., S1' and S2', respectively) may also be calculated and buffered at T+1. For example, state change S2' may be buffered in the timing dynamic field 416. State change S2' may be buffered because the next dataflow clock cycle (T+2) may still operate with the old state (S2). Such may be the case because the stage 434 may process input I2, which has already been processed by stage 432 with the initial state S1.

Figure 5C:
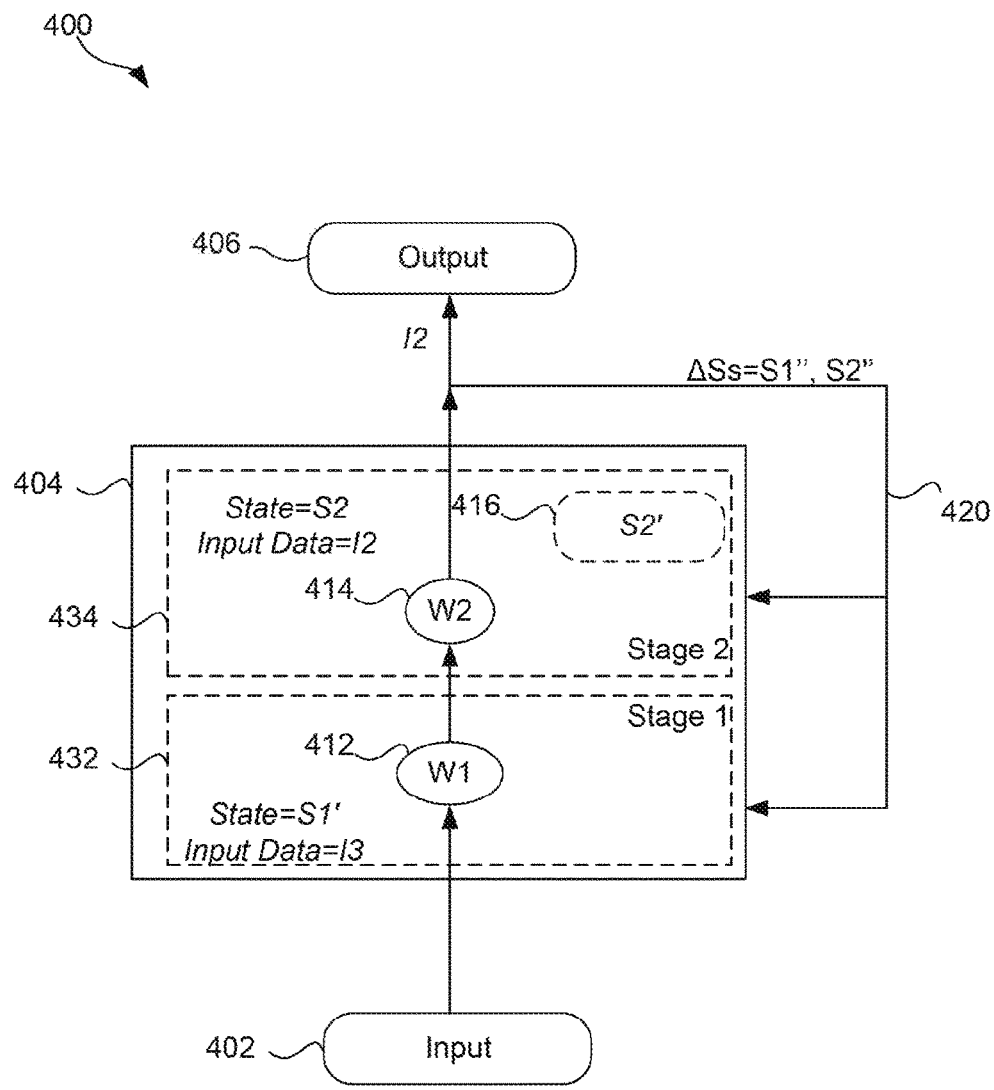

As FIG. 5C illustrates, during dataflow clock cycle T+2, stage 432 may execute the state function 412 on the next input data (e.g., I3), using the updated state data (e.g., S1'). Further, stage 434 may execute the state function 414 on the second input data (e.g., I2) still using the initial state (e.g., S2). Thus, unlike in a strict feedback loop, during a given dataflow clock cycle (e.g., T+2), the compute block 404 may be processing input data (e.g., I2 and I3) using different state data (e.g., S2 and S1', respectively).

Figure 5D:
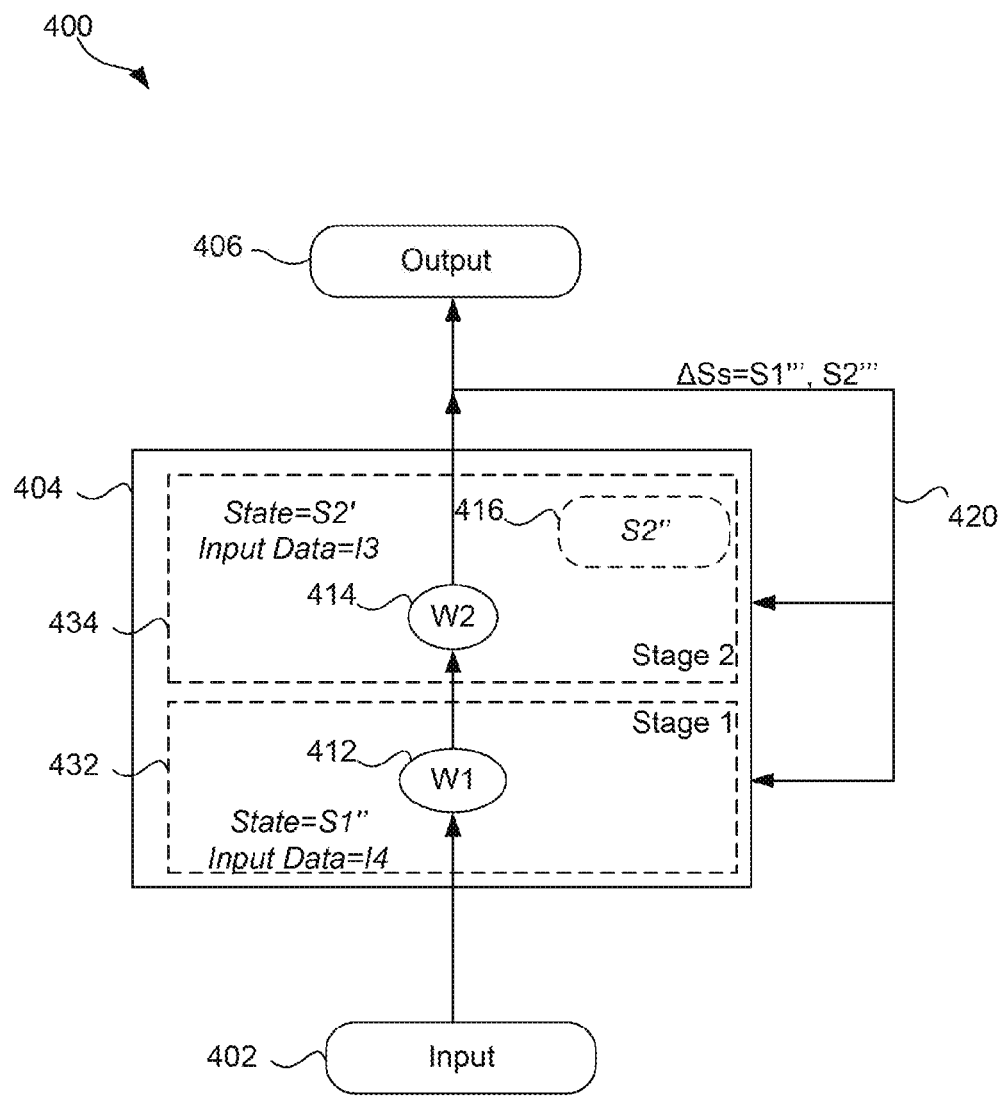

As FIG. 5D illustrates, during dataflow clock cycle T+3, stage 432 may execute the state function 412 on the next input data (e.g., I3), using the state data derived at dataflow clock cycle T+2 (e.g., S1"). Further, stage 434 may execute the state function 414 on the second input data (e.g., I2) using the state data derived at dataflow clock cycle T+1 (e.g., S2'). In some cases, the state data for stage 434 may come from the timing dynamic field 416.

Figure 6:
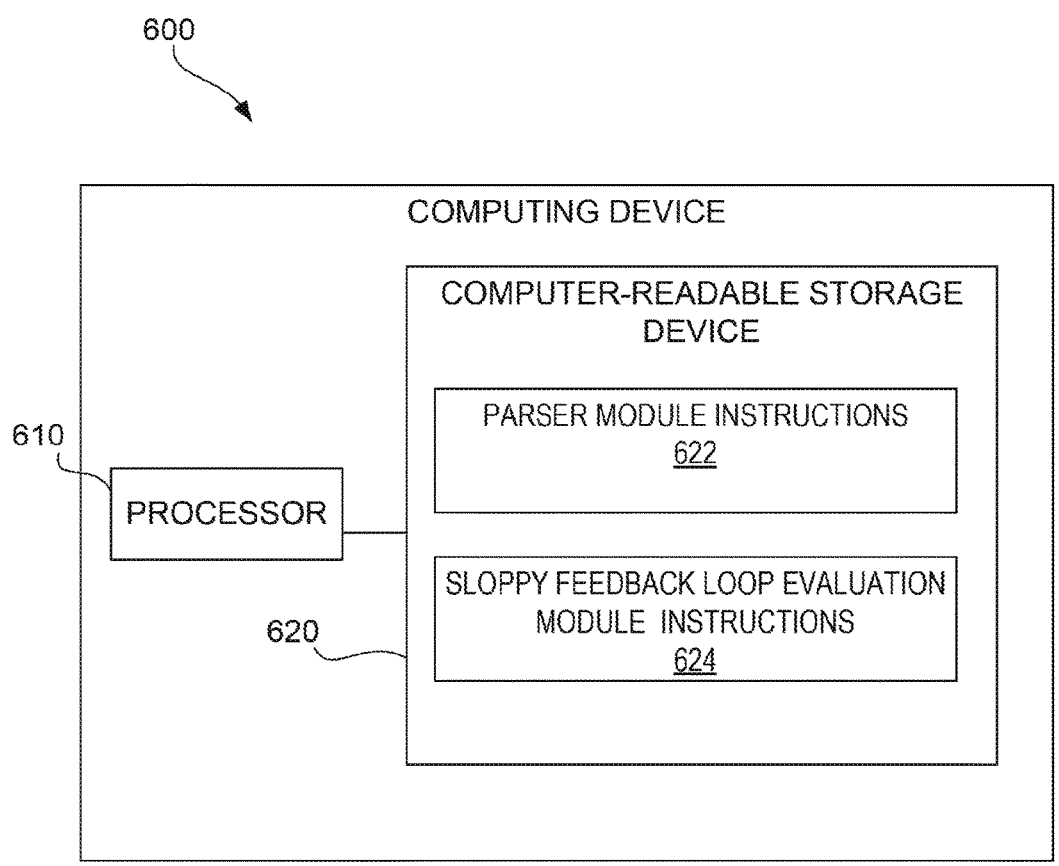
FIG. 6 is a block diagram of a computing device capable of sloppy feedback loop compilation, according to one example.

FIG. 6 is a block diagram of a computing device 600 capable of sloppy feedback loop compilation, according to one example. The computing device 600 includes, for example, a processor 610, and a computer-readable storage device 620 including instructions 622, 624. The computing device 600 may be, for example, a security appliance, a computer, a workstation, a server, a notebook computer, or any other suitable computing device capable of providing the functionality described herein.

The processor 610 may be, at least one CPU, at least one semiconductor-based microprocessor, at least one GPU, other hardware devices suitable for retrieval and execution of instructions stored in computer-readable storage device 620, or combinations thereof. For example, the processor 610 may include multiple cores on a chip, include multiple cores across multiple chips, multiple cores across multiple devices, or combinations thereof. The processor 610 may fetch, decode, and execute one or more of the instructions 622, 624 to implement methods and operations discussed above, with reference to FIGS. 1-5. As an alternative or in addition to retrieving and executing instructions, processor 610 may include at least one integrated circuit (IC), other control logic, other electronic circuits, or combinations thereof that include a number of electronic components for performing the functionality of instructions 622, 624.

Computer-readable storage device 620 may be any electronic, magnetic, optical, or other physical storage device that contains or stores executable instructions. Thus, computer-readable storage device may be, for example, Random Access Memory (RAM), an Electrically Erasable Programmable Read-Only Memory (EEPROM), a storage drive, a Compact Disc Read Only Memory (CD-ROM), and the like. As such, the machine-readable storage device can be non-transitory. As described in detail herein, computer-readable storage device 620 may be encoded with a series of executable instructions for sloppy feedback loop compilation.

As used herein, the term "computer system" may refer to one or more computer devices, such as the computer device 600 shown in FIG. 6. Further, the terms "couple," "couples," "communicatively couple," or "communicatively coupled" is intended to mean either an indirect or direct connection. Thus, if a first device, module, or engine couples to a second device, module, or engine, that connection may be through a direct connection, or through an indirect connection via other devices, modules, or engines and connections. In the case of electrical connections, such coupling may be direct, indirect, through an optical connection, or through a wireless electrical connection.

What is claimed is:

1. A method comprising:
obtaining, by a computer device of a compiler system, a dataflow application definition, the dataflow application definition including a feedback loop bounding a compute block;
determining, by the computer device of the compiler system, that the feedback loop is to be compiled as a sloppy feedback loop; and
compiling, by the computer device of the compiler system, the dataflow application definition into an executable object that pipelines the compute block of the dataflow application.

2. The method of claim 1, wherein determining that the feedback loop is to be compiled as the sloppy feedback loop comprises generating a parse tree of the dataflow application and detecting, in the dataflow application definition, a sloppy feedback loop syntax associated with the feedback loop.

3. The method of claim 1, wherein determining that the feedback loop is to be compiled as the sloppy feedback loop comprises generating a parse tree of the dataflow application and detecting, in the dataflow application definition, an absence of a strict feedback loop syntax associated with the feedback loop.

4. The method of claim 1, wherein compiling the dataflow application definition into the executable object that pipelines the compute block of the dataflow application comprises breaking the compute block into a compiler-controlled number of stages, wherein a dataflow clock cycle of the dataflow application is based on a time period to execute one of the stages.

5. The method of claim 4, wherein the stages include a first stage and a second stage, wherein in a dataflow clock cycle, the first stage is executable according to state data relating to a first point in time, and the second stage is executable according to state data relating to a second point in time.

6. The method of claim 4, wherein the stages include a first stage and a second stage, wherein in a dataflow clock cycle, the first stage is executable according to input data relating to a first point in time, and the second stage is executable according to input data relating to a second point in time.

7. The method of claim 4, wherein breaking the compute block into the stages comprises adding a timing dynamic field to one of the stages to buffer state data for a subsequent dataflow clock cycle.

8. The method of claim 4, wherein the stages include a first stage and a second stage, wherein during a dataflow clock cycle, output from the first stage is fed as input to the second stage.

9. A computer device comprising:
a processor; and
a non-transitory storage medium comprising compiler instructions executable on the processor to:
access a dataflow application definition of a dataflow application, the dataflow application definition including a compute block and a feedback loop connecting an output of the compute block with state data in the compute block;
relax a timing constraint associated with the compute block and the feedback loop based on a determination that the compute block and the feedback loop are to be treated as a sloppy feedback loop; and
compile the dataflow application definition into an executable object with the relaxed timing constraint.

10. The computer device of claim 9, wherein the determination that the compute block and the feedback loop are to be treated as the sloppy feedback loop is based on generating a parse tree of the dataflow application and detecting a sloppy feedback loop syntax in the dataflow application definition, the sloppy feedback loop syntax connecting the output of the compute block with the state data in the compute block.

11. The computer device of claim 9, wherein the determination that the compute block and the feedback loop are to be treated as the sloppy feedback loop is based on generating a parse tree of the dataflow application and detecting an absence of a strict feedback loop syntax connecting the output of the compute block with the state data in the compute block.

12. The computer device of claim 9, wherein the compiler instructions are executable on the processor to compile the dataflow application definition into the executable object with the relaxed timing constraint by breaking the compute block into stages, wherein a dataflow clock cycle of the dataflow application is based on a time period to execute one of the stages.

13. The computer device of claim 12, wherein the stages include a first stage and a second stage, wherein in a given dataflow clock cycle, the first stage is executable according to state data relating to a first point in time, and the second stage according to state data relating to a second point in time.

14. The device of claim 12, wherein the stages include a first stage and a second stage, wherein in a given dataflow clock cycle, the first stage is executable according to input data relating to data received at the input at a first point in time, and the second stage is executable according to input data relating data received at the input at a second point in time.

15. A non-transitory computer-readable storage medium comprising instructions that, when executed, cause a computer device to:
    obtain a user-defined definition of a dataflow application, the user-defined definition of the dataflow application including a compute block and a feedback loop bounding the compute block;
    determine, based on a sloppy feedback loop indicator included in the user-defined definition of the dataflow application, that the feedback loop is to be compiled as a sloppy feedback loop; and
    compile the user-defined definition of the dataflow application into an executable object that breaks the compute block into stages, wherein a dataflow clock cycle for the dataflow application is a period of time in which data flows from an input to a stage to an output of the stage.

16. The method of claim 1, wherein the dataflow application definition includes the compute block defined as a model of a dataflow that includes interconnected data fields and dataflow operators, and the dataflow application definition further includes an indicator specifying that the feedback loop in the dataflow application definition is to be compiled as the sloppy feedback loop.

17. The method of claim 4, wherein for a strict feedback loop, the dataflow clock cycle comprises a time period in which data flows into the compute block and flows out of the compute block, and wherein for the sloppy feedback loop, the compute block is to performed in a plurality of dataflow clock cycles corresponding to the respective stages.

18. The computer device of claim 13, wherein the first stage comprises a first function operable according to the state data relating to the first point in time, and the second stage comprises a second function operable according to the state data relating to the second point in time, the state data relating to the second point in time based on feedback data of the sloppy feedback loop.

19. The non-transitory computer-readable storage medium of claim 15, wherein the compute block in the user-defined definition of the dataflow application is defined as a model of a dataflow that includes interconnected data fields and dataflow operators.

20. The non-transitory computer-readable storage medium of claim 15, wherein the instructions when executed cause the computer device to:
    parse the user-defined definition of the dataflow application; and
    as part of the parsing, detect, in the user-defined definition, the sloppy feedback loop indicator specifying that the feedback loop is to be compiled as the sloppy feedback loop.

* * * * *